J. W. FOWLE.
MARINE ENGINE-GOVERNORS.
No. 194,037. Patented Aug. 14, 1877.
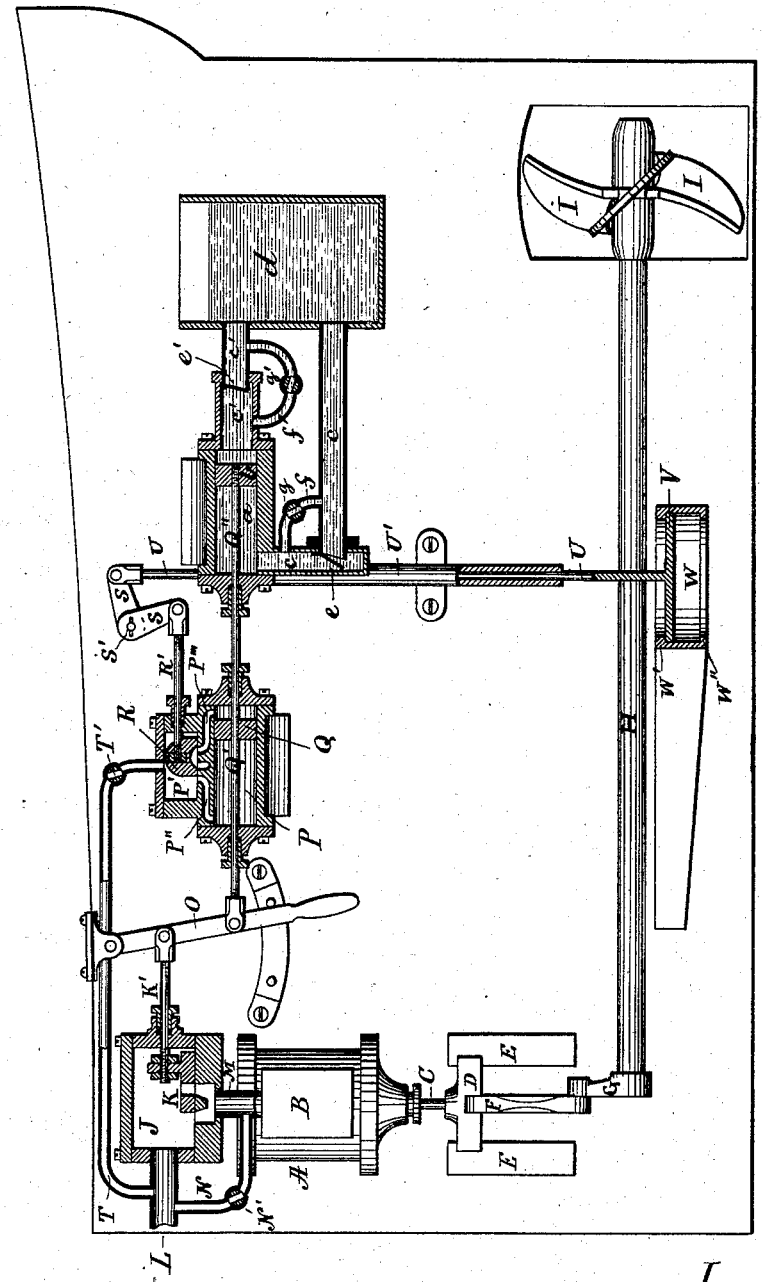
Witnesses:
Henry Chadbourn,
F. Allen.
Inventor:
Joseph W. Fowle
by Alban Andrew
his atty.

UNITED STATES PATENT OFFICE.

JOSEPH W. FOWLE, OF BOSTON, MASSACHUSETTS, ASSIGNOR OF ONE-HALF HIS RIGHT TO WILLIAM H. IRELAND, OF SAME PLACE.

IMPROVEMENT IN MARINE-ENGINE GOVERNORS.

Specification forming part of Letters Patent No. 194,037, dated August 14, 1877; application filed June 5, 1877.

*To all whom it may concern:*

Be it known that I, JOSEPH W. FOWLE, of Boston, in the county of Suffolk and State of Massachusetts, have invented certain new and useful Improvements in Marine-Engine Governors; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements in marine-engine governors for the purpose of automatically regulating the speed of the propeller, or other driving-wheel, as well as that of the engine, when the vessel is exposed to rough seas, in which the propelling wheel or wheels are oftentimes raised, partly or wholly, out of the water. When this occurs on steam-vessels not provided with proper automatic governors, the speed of the engine is dangerously increased if not checked in time by the engineer in charge, causing serious damages to both engine and driving-wheels or propeller. This my invention is designed to obviate this difficulty, and, unlike most governors for this purpose, it anticipates the movements of the engine, and does not, by any possible means, allow the engine to "run away" with the propeller or driving-wheels when raised wholly or partially out of the water, and prevents the breaking off of the blades of the propelling wheel or wheels, or the breaking of the shaft when the wheel or wheels again descend suddenly into the water.

Not alone does this governor regulate the speed of the engine and its driving wheel or wheels when the latter are raised wholly or partially out of the water, but, as the density of the water increases from the surface downward, and, in consequence, the propelling wheel or wheels meet with greater resistance the more they are submerged in the water, so this my improved governor will regulate automatically the slightest rise or fall of the vessel, even if the driving wheel or wheels are not raised out of the water at all, as only a few inches rise or fall of the vessel will be sufficient for the proper action of the governor.

My invention is constructed as follows: A float is movable in a suitable box, open in its upper and lower ends so as to allow free access of the sea to the upper and under sides of the float, by which the said float will move in the box upward and downward, as the propeller is lowered and raised, or, more properly, the float remains stationary in the water during the rise and fall of the open-mouthed box. The latter is provided in its upper and lower ends with an annular flange or stop, so as to prevent the float from ever getting entirely out of its box. To the float is secured an upwardly-projecting rod, that passes through a pipe or stuffing-box, and is jointed in its upper end to a knee-lever, movable around a fulcrum. The other end of said knee-lever is jointed to a valve-rod that actuates a valve in connection with a small intermediate steam-cylinder, the forward end of the piston-rod of which is jointed to the ordinary throttle-lever, or directly to the throttle-valve rod if quicker action is desired, which lever is jointed to a throttle-valve governing the admission of the steam from the main steam-pipe to the ordinary valve-chest of the steam-cylinder of the engine. The small intermediate steam-cylinder receives its steam through a pipe leading from the boiler or main steam-pipe, and is regulated by a suitable cut-off, or the piston of said cylinder may be actuated by air or gas pressure without departing from the spirit of my invention.

The arrangement and combination as above described would, in many cases, be sufficient; but, to prevent a too sudden opening and closing of the throttle-valve by the fall and rise of the float, I employ, in connection with the intermediate steam-cylinder aforesaid, a pump-cylinder, the piston-rod of which forms an extension of the piston-rod of the former, and is movable through stuffing-boxes in the usual way. From each end of the said pump-cylinder leads a pipe to a water-tank containing water or suitable liquid, in each of which pipes is arranged a self-acting valve in such a manner that the said valves will open automatically to let the liquid into the cylinder, but will close of their own accord when the liquid is forced out from the said cylinder. To allow the liquid to escape gradually from the cylinder I locate around each of the said valves a small pipe, having a suitable valve or cut-off, by which the exit area of the liquid can be effectually controlled and regulated, by which the action of the piston of the intermediate steam-cylinder is retarded by the liquid in the pump-cylinder that is gradually forced out through the small regulating-pipe and its cut-off around the inlet-valves on the pipes leading to the tank or receptacle.

The liquid in the tank is used over and over again to pass in and out of the pump-cylinder, and only very little thereof is wasted by leakage and evaporation.

The accompanying drawing represents a longitudinal section of my invention.

A represents the main steam-cylinder of the engine, on which B is the valve-chest, C the piston-rod, D the cross-head, E E the guides, F the connecting-rod, G the crank, H the shaft, and I the propelling-wheel, in the usual manner.

J is the steam chest or box, and K is the throttle-valve to the main cylinder A.

L is the main steam-pipe from the boiler to the steam-chest. M is the supply-pipe leading from the throttle-valve to the valve-chest B. N is the small steam-pipe, with its valve or cut-off N', leading from the main steam-pipe L to the supply-pipe M. K' is the throttle-valve rod, jointed to the throttle-lever O, as shown.

P is a small intermediate steam-cylinder, in the usual manner, having a piston, Q, and piston-rod Q', jointed in its forward end to the throttle-lever O. The cylinder P is provided with a steam-chest, P', passages P'' P''', and valve R, provided with the valve-rod R', jointed in its rear end to the lower portion of the knee-lever S, movable around the fulcrum S', as shown.

T is a small supply-pipe leading from the main pipe L to the valve-chest P', which supply-pipe is provided with a valve or cut-off, T', as shown.

The rear end of the knee-lever S is jointed to the upper end of the float-rod U, guided through a suitable tube or stuffing-box, U', and having in its lower end, below the water-line, secured a suitable float, V, as shown. This float is freely movable in a box or receptacle, W, open at top and bottom, where it is provided with annular inner projections W' W''', as and for the purpose set forth.

a is the pump-cylinder, in which b is the piston, and Q'' the piston-rod, the latter being a rear extension of the piston-rod Q', belonging to the cylinder P and piston Q.

c c' represent pipes leading from each end of cylinder a to the tank or receptacle d. Each of said pipes c c' is provided with a self-closing valve or cut-off e e', as shown.

f f' represent small pipes leading from each end of the cylinder a, respectively, to the pipes c c', and in such a manner as to pass around the self-closing valves e e'. Each of the pipes f f' is provided with a suitable valve or cut-off, g g', as shown, by which the amount of escape from the cylinder ends to the cistern or receptacle d is easily regulated, according to the time in which it is desired automatically to close the throttle-valve after the float is acted upon by the rise or fall of the vessel.

The operation of this invention is as follows: As the propeller rises upward more or less, the float V remains still till it reaches the lower projection W'' of the open box W, which latter moves upward with the vessel and its wheel or propeller, and in doing so the rod U is moved downward, by which the knee-lever S is turned around its fulcrum S', and thus pushing the valve R and its valve-rod R' forward, lets the steam into the back end of the steam-cylinder P, by which the piston Q and piston-rod Q' are moved forward, and, as the latter is connected to the throttle-lever O, it will be seen that the steam is automatically cut off from the main cylinder A by the throttle-valve K, leaving the cylinder A only supplied by the small pipe N, just enough to keep the propeller in a slow motion without letting it stop on its center.

Now, when the piston Q and its rod Q' move forward, as described, the pump-piston b must also move forward at the same time, as it is connected to the former by the continuous rod Q''', and the water in the cylinder a that is before the piston b can be expelled therefrom only as fast as it can pass through the small pipe f and its valve or cut-off g, as it cannot go out through the larger pipe c on account of the self-closing valve e being on its seat; and thus it will be seen that the speed of closing the throttle-valve K is easily regulated by opening or closing the valves or cut-offs g g' more or less, as may be desired.

When the propeller commences to go downward the reverse of the operation takes place, and the throttle-valve is as gradually opened as it was closed by the previous operation.

Having thus fully described the nature, construction, and operation of my invention, I wish to secure by Letters Patent and claim—

1. The receptacle W, open in its upper and lower ends, as described, with its float or piston V below the water-line, in combination with the valve R in the cylinder P, and connecting mechanism thereto, as and for the purpose specified.

2. In combination with the cylinder P, the pump-cylinder a, its pipes c c', valves e e', pipes $f\,f'$, and cut-offs $g\,g'$, for the operation of the throttle-valve K, as and for the purpose set forth and described.

3. In combination with the pump-cylinder $a$ and its pipes and valves or cut-offs, as described, the tank or receptacle $d$, as set forth, and for the purpose specified.

In testimony that I claim the foregoing as my own invention I have affixed my signature in presence of two witnesses.

JOSEPH W. FOWLE.

Witnesses:
ALBAN ANDRÉN,
WM. H. IRELAND.